United States Patent (10) Patent No.: US 11,605,302 B2
Boggs et al. (45) Date of Patent: Mar. 14, 2023

(54) TIME-CRITICAL OBSTACLE AVOIDANCE PATH PLANNING IN UNCERTAIN ENVIRONMENTS

(71) Applicant: Rockwell Collins, Inc., Cedar Rapids, IA (US)

(72) Inventors: Christopher M. Boggs, Gainesville, VA (US); Ramachandra J Sattigeri, Ashburn, VA (US); Arjun Passi, Lynchburg, VA (US); Paxton Alsgaard, Yankton, SD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 95 days.

(21) Appl. No.: 17/093,859

(22) Filed: Nov. 10, 2020

(65) Prior Publication Data

US 2022/0148433 A1 May 12, 2022

(51) Int. Cl.
*G08G 5/00* (2006.01)
*G08G 5/04* (2006.01)

(52) U.S. Cl.
CPC .......... *G08G 5/003* (2013.01); *G08G 5/0056* (2013.01); *G08G 5/0069* (2013.01); *G08G 5/045* (2013.01)

(58) Field of Classification Search
CPC .... G08G 5/003; G08G 5/0056; G08G 5/0069; G08G 5/045
See application file for complete search history.

(56) References Cited

U.S. PATENT DOCUMENTS 8,577,538 B2 * 11/2013 Lenser .................. G06F 3/0412
701/28
9,858,822 B1 1/2018 Gentry
9,870,712 B1 1/2018 Weichbrod
10,502,584 B1 12/2019 Suiter et al.
10,540,901 B2 1/2020 Clark
10,553,122 B1 2/2020 Gilboa-Amir et al.
2015/0160024 A1 * 6/2015 Fowe .................. G01C 21/34
701/400
2017/0102707 A1 4/2017 Reichel et al.

(Continued)

FOREIGN PATENT DOCUMENTS

CN 104850134 A 8/2015

OTHER PUBLICATIONS

Sebastian Scherer et al: "First results in autonomous landing and obstacle avoidance by a full-scale helicopter", Robotics and Automation (ICRA), 2012 IEEEInternational Conference on, IEEE, May 14, 2012 (May 14, 2012), pp. 951-956, XP032450946, DOI: 10.1109/ICRA.2012.6225215 ISBN: 978-1-4673-1403-9.

*Primary Examiner* — Hunter B Lonsberry
*Assistant Examiner* — Elizabeth Yang
(74) *Attorney, Agent, or Firm* — Suiter Swantz pc llo

(57) ABSTRACT

A system and method for identifying a safe path in a partially unknown environment in a time critical fashion includes identifying long range paths that avoid known obstacles. Short range paths within a receding horizon are identified corresponding to the long range paths, the short range paths avoiding known obstacles and unknown regions. Each short range path is broken into segments based on subsequent control operations or timing, and abort procedures are identified corresponding to each segment to enforce time critical availability of a safe action. Short range paths are excluded unless abort procedures can be identified for subsequent segments.

8 Claims, 2 Drawing Sheets

(56) References Cited

U.S. PATENT DOCUMENTS

| | | |
|---|---|---|
| 2017/0116863 A1* | 4/2017 | Valls Hernández ........................ G08G 5/0052 |
| 2017/0193830 A1* | 7/2017 | Fragoso ............... G08G 5/0069 |
| 2018/0012503 A1 | 1/2018 | Roger et al. |
| 2018/0322646 A1* | 11/2018 | Matthies ............... B64C 39/024 |
| 2018/0348766 A1 | 12/2018 | Lewis et al. |
| 2019/0147749 A1 | 5/2019 | Lewis et al. |
| 2019/0346845 A1 | 11/2019 | Rottkamp |
| 2020/0193844 A1 | 6/2020 | Mahkonen et al. |
| 2020/0273356 A1 | 8/2020 | Raynaud et al. |
| 2021/0356279 A1* | 11/2021 | Szigeti ............... G06Q 30/0639 |
| 2022/0227367 A1* | 7/2022 | Kario ................... B60W 50/14 |

* cited by examiner

TIME-CRITICAL OBSTACLE AVOIDANCE PATH PLANNING IN UNCERTAIN ENVIRONMENTS

BACKGROUND

Autonomous aviation applications need to perform onboard sensor-based autonomous path planning which follows a desired path while also avoiding obstacles. When flying in a constrained and uncertain obstacle environment, this capability may be time-critical. Such path planning and obstacle avoidance requires complex, data-dependent software functions, which makes verification timing requirements intractable.

SUMMARY

In one aspect, embodiments of the inventive concepts disclosed herein are directed to a system and method for identifying a safe path in a partially unknown environment in a time critical fashion. Long range paths are identified that avoid known obstacles. Short range paths within a receding horizon are identified corresponding to the long range paths, the short range paths avoiding known obstacles and unknown regions.

In a further aspect, each short range path is broken into segments based on subsequent control operations or timing, and abort procedures are identified corresponding to each segment. Short range paths are excluded unless abort procedures can be identified for subsequent segments.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
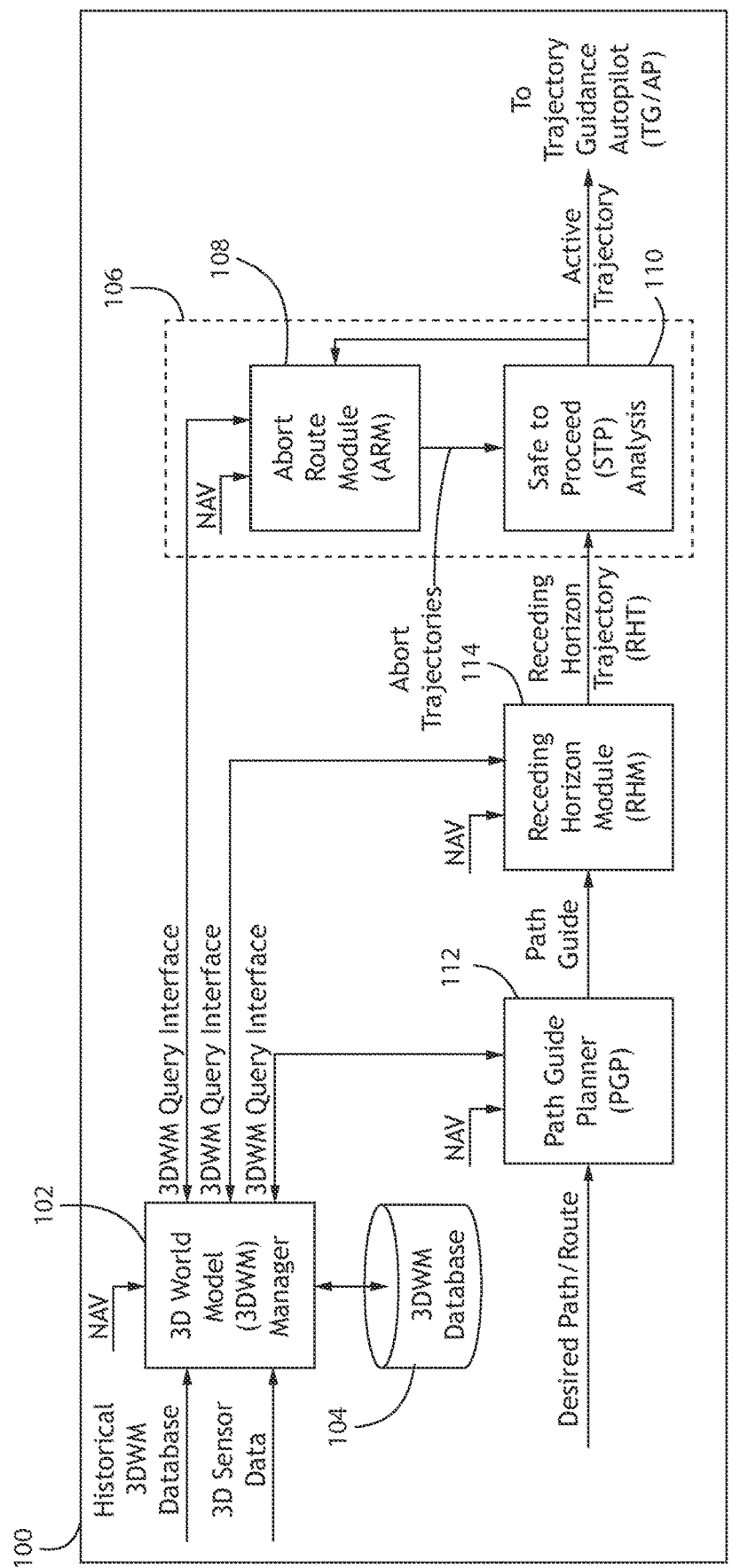
FIG. 1 shows a block diagram of a system for obstacle avoidance path planning according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for identifying a safe path in a partially unknown environment in a time critical fashion includes identifying long range paths that avoid known obstacles. Short range paths within a receding horizon are identified corresponding to the long range paths, the short range paths avoiding known obstacles and unknown regions. Each short range path is broken into segments based on subsequent control operations or timing, and abort procedures are identified corresponding to each segment. Short range paths are excluded unless abort procedures can be identified for subsequent segments.

Referring to FIG. 1, a block diagram of a system 100 for obstacle avoidance path planning according to an exemplary embodiment is shown. The system 100 includes a 3D world model manager 102 that accesses and updates a 3D world model database based on historical 3D world model data and sensors such as 3D sensors in a mobile platform.

A path guide planner 112 receives a desired path (potentially defined by one or more waypoints) and queries the 3D world model manager 102 to retrieve a partial world map corresponding to the general area of the flight path. The path guide planner 112 identifies one or more potential long range paths to each of the waypoints. Long range paths may correspond to time frames on the order of an hour. In at least one embodiment, the path guide planner 112 receives navigationally relevant data from on-board and/or remote sensors such as a radar system, weather reporting system, etc. The path guide planner 112 identifies obstacles via the navigationally relevant data such as weather related obstacles, physical obstacles, and obstacles related to nearby traffic, and identifies the potential long range paths that avoid those obstacles. It may be appreciated that the potential long range paths may necessarily include segments of unknown availability. The path guide planner 112 periodically replans the long range paths according to updated navigationally relevant data. For example, segments of unknown availability may be filled in as they get closer.

A receding horizon module 114 receives the potential long range paths from the path guide planner 112 and navigationally relevant data. The navigationally relevant data defines a horizon of available data; the receding horizon module 114 queries the 3D model world manager 102 for a partial world map corresponding to the area within that horizon and correlates the navigationally relevant data to that partial world map. The receding horizon module 114 identifies obstacles within the area based on the navigationally relevant data, and unknown regions for which navigationally relevant data is non-existent or so sparse or old that unknown obstacles could exist there. The receding horizon module 114 then identifies one or more short range paths or receding horizon trajectories within that area and along the long range paths that avoid any identified obstacles and unknown regions or otherwise modifies the long range paths according to the updated navigationally relevant data and stricter obstacle avoidance criteria. Short range paths may correspond to time frames on the order of a minute.

In at least one embodiment, the receding horizon module 114 enforces high-fidelity vehicle performance limitations to ensure the receding horizon module 114 can be tracked by a trajectory-based guidance and autopilot function with smaller flight technical error.

In at least one embodiment, the receding horizon module 114 operates continuously as navigationally relevant data is received and the horizon of available data changes over time to replan new short range paths to reach the waypoints.

In at least one embodiment, time-critical functions 106 continuously operate to analyze the short range paths. An abort route module 108 receives navigationally relevant data and queries the 3D world model manager 102 for a partial world map and generates potential abort options for each segment of each short range path, including braking to hover, loiter at different turn rates, abort path planning, other canned abort actions, etc. To account for vehicle response time, the abort options may initially follow the active trajectory for some time before transitioning to an abort action. Abort trajectory generation may also consider high-fidelity vehicle dynamic limitations Each of these abort trajectories can be collision-detected against the 3D world model manager 102.

A safe to proceed module 110 analyzes each short range path segment and potential abort options to identify and any short range paths lack a potential abort option. In at least one embodiment, the abort route module 108 and safe to proceed module 110 are configured to segment each short range path based on some threshold such as time or distance wherein a potential abort option is associated with each segment to ensure a potential abort option is always available.

The safe to proceed module 110 selects or prioritizes all short range paths that are completely serviced by potential abort options. In at least one embodiment, short range paths may be selected or prioritized based on path efficiency or a safety metric such as availability of redundant abort options. An autopilot application may then use the short range paths.

In at least one embodiment, the 3D world model manager 102, path guide planner 112, receding horizon module 114, abort route module 108, and safe to proceed module 110 are embodiment in software processes executed by an on-board processor.

Figure 2:
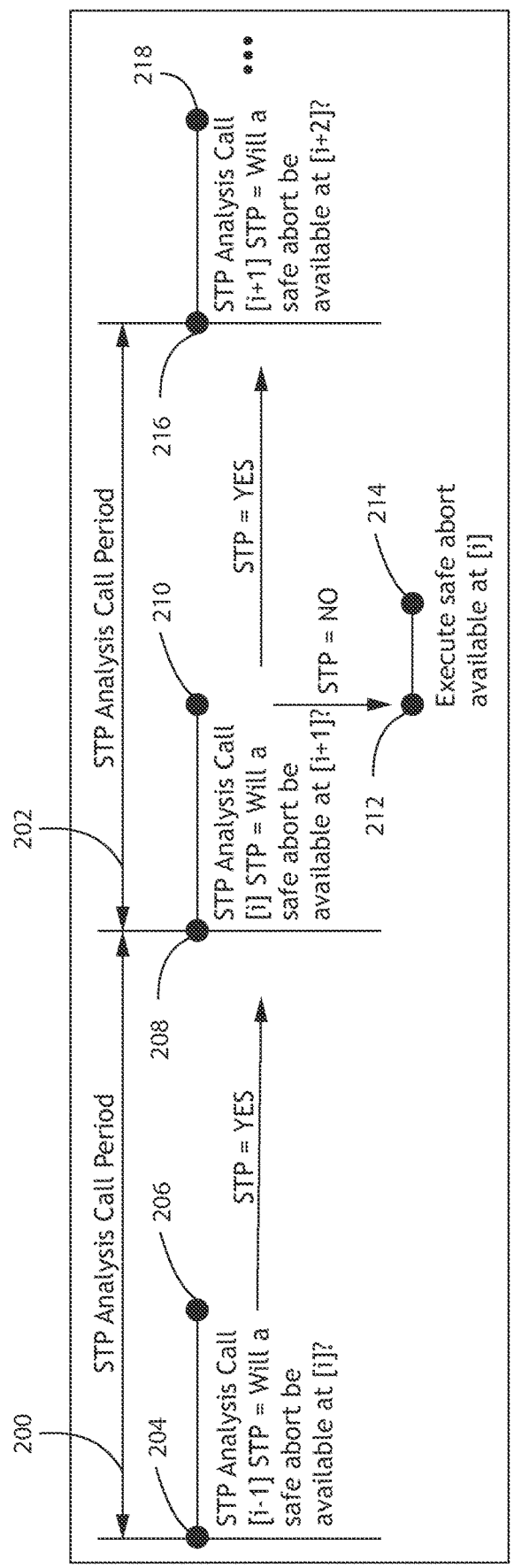
FIG. 2 shows a block diagram of timeline of a path planning processes according to an exemplary embodiment.

Referring to FIG. 2, a block diagram of timeline of a path planning processes according to an exemplary embodiment is shown. A safe to proceed module periodically analyzes short range paths to determine if abort options are available for upcoming segments whenever new short range path options are identified, for example whenever a receding horizon module receives new navigationally relevant data. During each call period 200, 202, the safe to proceed module receives potential abort options corresponding to points 204, 206, 208, 210, 216, 218 representing discreet locations or discreet times within the short range path and determines at least one abort option exists for the entire duration between adjacent points 204, 206, 208, 210, 216, 218; for example, during a first call period 200, the safe to proceed module determines if at least one abort option exists between a first discreet point 204 and a subsequent second discreet point 206 along the same short range path. Furthermore, during a subsequent call period 202, the safe to proceed module determines if at least one abort option exists between a third discreet point 208 and a subsequent fourth discreet point 210 along the same short range path.

Call periods 200, 202 are defined according to near future segments of a short range path such that the safe to proceed analysis is completed for a segment before the segment is actually entered by the mobile platform performing the analysis. For example, before the mobile platform reaches the first discreet point 204, the safe to proceed module determines if an abort option exists between the first point 204 and the second point 206; if so, the safe to proceed module may indicate to an autopilot that it is safe to proceed to the first point 204. Furthermore, the safe to proceed module may perform the same analysis for every potential point between the first point 204 and the third point 208, when the second call period 202 performs the same analysis for subsequent points 208, 210, 216. If the safe to proceed module determines during a call period 200, 202 that an abort option does not exist, an abort option identified during a prior call period is executed. For example, during the second call period 202, the safe to proceed module may determine that between some interstitial periods 202, 214, no safe abort option exists. Because the second call period 202 is executed before the mobile platform reaches the third point 208, and because the second call period 202 is only executed if abort options were available at all times between the first period 204 and third period 208, an existing abort option from the first call period 200 is executed.

In at least one embodiment, call periods 200, 202 may be executed at a known, regular schedule. Identifying abort options is time critical for safety; therefore a regular schedule ensures that if no abort option exists for a future point 204, 206, 208, 210, 216, 218, a current abort option will be executed.

Call periods 200, 202 are defined according to safety-critical timing requirements while allows for complex functions. In at least one embodiment, a threshold time period may be defined for completion of each call period; if the safe to proceed analysis cannot be completed within the defined time period, the safe to proceed module determines that no abort action will be guaranteed if the platform proceeds further along the current route and a previously determined abort action is still available to execute.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method of path planning comprising:
receiving a 3D world model;
receiving a path defined by two or more waypoints;
receiving navigationally relevant data from one or more sensors;
identifying one or more known obstacles in the 3D world model proximal to the path based on the navigationally relevant data;
defining one or more long range paths based on the 3D world model, path, and one or more known obstacles;
identifying one or more unknown regions in the 3D world model proximal to the one or more long range paths based on the navigationally relevant data;
defining one or more short range paths based on the 3D world model, the one or more long range paths, the one or more known obstacles, and the one or more unknown regions;
selecting a short range path from the one or more short range paths;
identifying one or more executable abort procedures associated with each short range path;
if any of the one or more short range paths cannot be associated with an executable abort procedure, removing that short range path from the one or more short range paths;
organizing the one or more short range paths into a hierarchy of short range paths based on overlapping segments;
associating each executable abort procedure with a corresponding segment;
identifying one or more current segments of the short range paths corresponding to a next path selection decision;
identifying one or more subsequent segments of the short range paths corresponding to a subsequent path selection decision;
determining that there is no executable abort procedures for subsequent segments; and
executing an executable abort procedure for a current segment by implementing corresponding aircraft control surface operations,
wherein:
the one or more long range paths are defined to avoid the one or more known obstacles;
the one or more short range paths are defined to avoid the one or more known obstacles and the one or more unknown regions; and
the aircraft control surface operations implement one of the one or more short range paths to avoid the one or more known obstacles and the one or more unknown regions in an aircraft.

2. The method of claim 1, further comprising:
if any of the one or more short range paths include subsequent segments that cannot be associated with an executable abort procedure, removing that short range path from the one or more short range paths.

3. The method of claim 1, further comprising:
if any of the one or more short range paths include subsequent segments that cannot be associated with an executable abort procedure within a predetermined threshold of time, removing that short range path from the one or more short range paths.

4. The method of claim 1, wherein the long range paths are defined by time frames of at least one hour and short range paths are defined by time frames of no more than two minutes.

5. A autonomous aircraft system comprising:
at least one processor in data communication with a memory storing processor executable code for configuring the at least one processor to:
receive a 3D world model;
receive a path defined two or more waypoints;
receive navigationally relevant data from one or more sensors;
identify one or more known obstacles in the 3D world model proximal to the path based on the navigationally relevant data;
define one or more long range paths based on the 3D world model, path, and one or more known obstacles;
identify one or more unknown regions in the 3D world model proximal to the one or more long range paths based on the navigationally relevant data;
define one or more short range paths based on the 3D world model, the one or more long range paths, the one or more known obstacles, and the one or more unknown regions;
select a short range path from the one or more short range paths;
identify one or more executable abort procedures associated with each short range path;
if any of the one or more short range paths cannot be associated with an executable abort procedure, remove that short range path from the one or more short range paths;
organize the one or more short range paths into a hierarchy of short range paths based on overlapping segments;
associate each executable abort procedure with a corresponding segment;
identify one or more current segments of the short range paths corresponding to a next path selection decision;
identify one or more subsequent segments of the short range paths corresponding to a subsequent path selection decision;
determine that there is no executable abort procedures for subsequent segments; and
execute an executable abort procedure for a current segment by implementing corresponding aircraft control surface operations,
wherein:
the one or more long range paths are defined to avoid the one or more known obstacles;

the one or more short range paths are defined to avoid the one or more known obstacles and the one or more unknown regions; and the aircraft control surface operations implement one of the one or more short range paths to avoid the one or more known obstacles and the one or more unknown regions in an aircraft.

6. The autonomous aircraft system of claim 5, wherein the at least one processor is further configured to:

if any of the one or more short range paths include subsequent segments that cannot be associated with an executable abort procedure within a predetermined threshold of time, remove that short range path from the one or more short range paths.

7. The autonomous aircraft system of claim 5, wherein the long range paths are defined by time frames of at least one hour and short range paths are defined by time frames of no more than two minutes.

8. A computer apparatus comprising:

at least one processor in data communication with a memory storing processor executable code for configuring the at least one processor to:

receive a 3D world model;

receive a path defined two or more waypoints;

receive navigationally relevant data from one or more sensors;

identify one or more known obstacles in the 3D world model proximal to the path based on the navigationally relevant data;

define one or more long range paths based on the 3D world model, path, and one or more known obstacles;

identify one or more unknown regions in the 3D world model proximal to the one or more long range paths based on the navigationally relevant data;

define one or more short range paths based on the 3D world model, the one or more long range paths, the one or more known obstacles, and the one or more unknown regions;

select a short range path from the one or more short range paths;

identify one or more executable abort procedures associated with each short range path;

if any of the one or more short range paths cannot be associated with an executable abort procedure, remove that short range path from the one or more short range paths;

organize the one or more short range paths into a hierarchy of short range paths based on overlapping segments;

associate each executable abort procedure with a corresponding segment;

identify one or more current segments of the short range paths corresponding to a next path selection decision;

identify one or more subsequent segments of the short range paths corresponding to a subsequent path selection decision;

determine that there is no executable abort procedures for subsequent segments; and execute an executable abort procedure for a current segment by implementing corresponding aircraft control surface operations, wherein:

the one or more long range paths are defined to avoid the one or more known obstacles;

the one or more short range paths are defined to avoid the one or more known obstacles and the one or more unknown regions; and the aircraft control surface operations implement one of the one or more short range paths to avoid the one or more known obstacles and the one or more unknown regions in an aircraft.

* * * * *